March 26, 1940. T. W. KAESTNER 2,194,503
MECHANICAL MOVEMENT
Filed June 3, 1937

INVENTOR.
THANKMAR WALTER KAESTNER.
BY Allen & Allen
ATTORNEYS.

Patented Mar. 26, 1940

2,194,503

UNITED STATES PATENT OFFICE 2,194,503

MECHANICAL MOVEMENT

Thankmar Walter Kaestner, Cincinnati, Ohio, assignor to The Crosley Corporation, Cincinnati, Ohio, a corporation of Ohio Application June 3, 1937, Serial No. 146,258

3 Claims. (Cl. 74—76)

My invention relates to the broad classification of mechanical movements and specifically to a gear case assembly wherein the movement of a rotating member rotating at a fixed speed in one direction is transformed into an oscillating movement. The gear case assembly is designed particularly for use in connection with a drive for a washing machine wherein a dolly or washing machine bowl is oscillated through a semi-circular arc, followed by a reverse movement in the same semi-circular arc.

It is an object of my invention to provide a gear case assembly in which the number of movable parts will be considerably reduced, wherein a reduction gear unit is so combined with other mechanical elements that reciprocating movement may be produced in a driven shaft.

Another object of my invention is to provide a reciprocating rack having a rear face provided with a slotted portion for receiving a crank pin carried by a rotating wheel, whereby the movement of the rotating wheel is effective for reciprocating the rack in a plane at a right angle to the axis of the rotating wheel.

The above objects and other objects to which reference will be made in the ensuing disclosure, I accomplish by that combination and arrangement of parts of which I have shown a preferred embodiment which will enable others to practice the invention, and to make such modifications as will be expedient to utilize the principle of the invention for such purposes as those for which the mechanical movement may be desirable.

Referring to the drawing.

Figure 2:
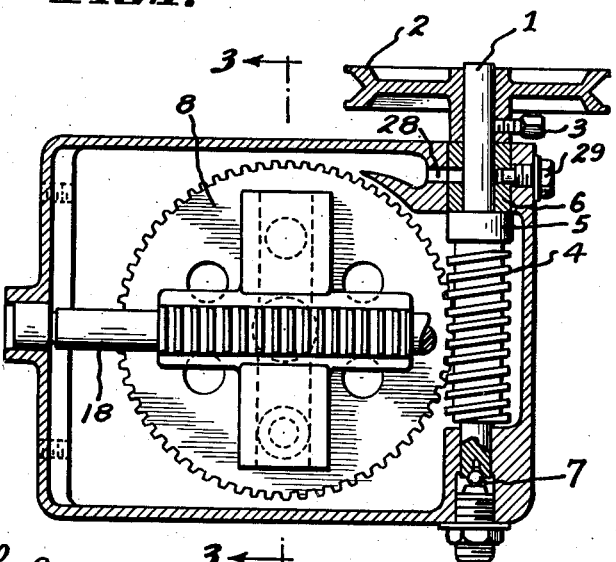
Fig. 2 is a sectional view taken along the lines 2—2 of Fig. 1.

A rotating drive shaft 1 which as indicated in Fig. 2, may have a driving pulley 2 fixed thereon by means of a set-screw 3; carries a worm 4. The shaft 1 is provided with a collar 5, which bears against a bushing 6 and an adjustable ball bearing 7 which impinges against the axis of the shaft 1. This construction is conventional in reduction gear units.

Figure 4:
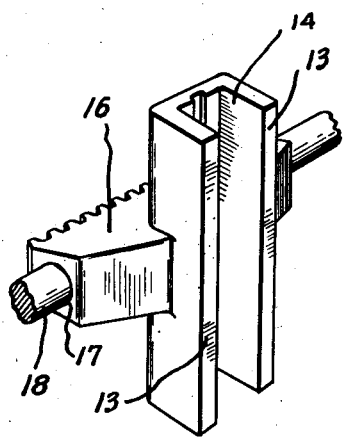
Fig. 4 is a perspective view of the rack element of the combination.
Figure 1:
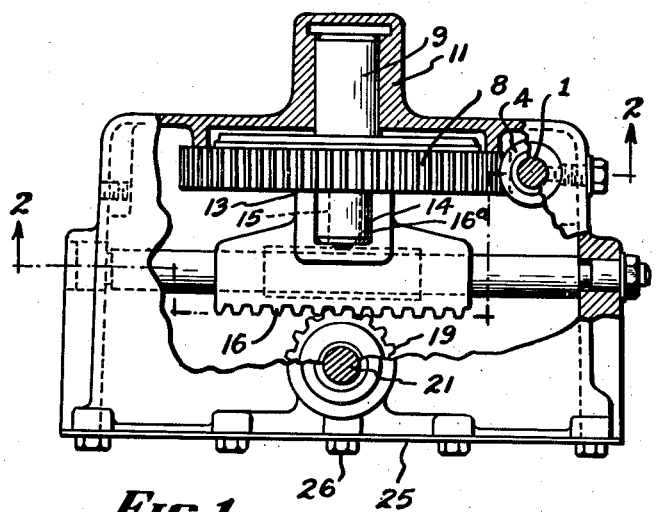
Figure 1 is a plan view of the gear case assembly with one of the walls cut away showing in cross section the essential elements of the combination.
Figure 3:
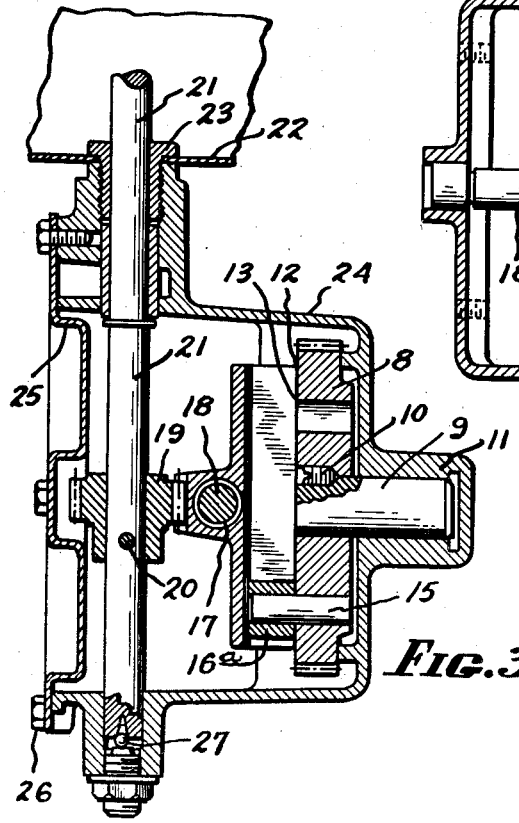
Fig. 3 is a sectional view taken along the lines 3—3 of Fig. 2.

A worm wheel 8 is fixedly mounted on a stub shaft 9 by means of a set screw 10. The stub shaft is journaled in a hub 11 as indicated in Figs. 1 and 3.

The face 12 of the worm wheel 8 is machined for providing a smooth bearing surface against which the guides 13 at the sides of a grooved portion 14 of a rack will fit snugly.

The worm wheel 8 carries a crank pin 15 having a crank pin roller 16a, which engages within the slot 14 of the rear face of the rack member 16.

The rack member 16 has a journal 17 through which a fixed shaft 18 extends. The teeth of the rack member 16 engage a pinion 19, pinned as indicated at 20 on a driven shaft 21.

The shaft 21 is operatively connected or may form the shaft on which the dolly of a washing machine is mounted. I have indicated at 22 the bottom of the bowl wall of a washing machine, the shaft 21 having a shouldered nut 23 which clamps the bowl wall between the collar of the nut and the casing 24.

The entire assembly may be mounted in a casing 24 having a cover plate 25 removably secured to the casing as by means of bolts 26.

The shaft 21 is shown as being provided with a ball bearing mounting 27, which as has been stated with respect to the shaft 1 and the bearing 27, is conventional practice.

It will be observed that the unit requires very few mechanical moving parts, the elimination of parts being primarily effected because of the construction of the rack member 16 journaled on the shaft 18 and restrained to movement in a given plane, together with the guides 13 which have bearing against the smooth face of the worm wheel 8.

The dog point set screw 29 extending into the internally threaded opening 28 holds the bushing 6 in place. The passage 28 guides the lubricant to the shaft 1. Lubricant is put into the gear case before the cover is attached.

The rack element 16 is shown as made from a single casting with the parts thereof machined for their respective mechanical use. It will be obvious that the rack element may be constructed in two parts instead of one, but it should be understood that while the shaft 18 restrains the rack to movement in a given plane, this restraint must be augmented by some other means such as provided by the guides 13 bearing against the smooth face of the worm wheel 8. This combination prevents the rocking of the rack member on the shaft. An obvious expedient to accomplish the same purpose which is not illustrated and which will be readily understood, is to substitute for the round shaft 18, a square shaft and to substitute for the round journal 17 a square opening in the rack. Such a combination accomplishes the purpose of my invention, but I find the particular mechanism illustrated to be more satisfactory in its distribution of the strains incident to its operation.

Having thus described my invention, what I claim as new and desire to secure by Letters Patent is:

1. Mechanical means for producing reciprocating movement comprising in combination with a reduction gear train, a crank pin carried by a gear of said train, a rack restrained to reciprocating movement in a plane at a right angle to the axis of said crank pin, said rack having a rear face grooved to receive said crank pin and guides bearing against a face of said gear carrying said crank pin to prevent said rack from rocking in the plane of its reciprocating movement.

2. A reduction gear case assembly comprising in combination with a rotary driving member having a smooth machined face, a rack member journaled for reciprocating movement on an axis extending at a right angle to the axis of the rotary driving member, said member carrying a crank pin, and said rack member provided with a slot within which the movement of said crank pin is confined, and means extending from said rack and bearing against the smooth machined face of said rotary driving member for preventing said rack from rocking on its axis.

3. In combination in a reduction gear case assembly, a rack member journaled and restrained to movement in a fixed plane, a rotary member mounted at a right angle to the plane of movement of said rack member, said rotary member provided with means interconnecting with said rack member for reciprocating said rack member in its fixed plane of movement, the journal for said rack member comprising a shaft extending through said rack in the plane of the teeth of said rack, and the means restraining said rack to movement in a fixed plane comprising guides extending from said rack and preventing said rack from rocking on its journal.

THANKMAR WALTER KAESTNER.